(12) United States Patent
Komatsu et al.

(10) Patent No.: US 11,113,503 B2
(45) Date of Patent: Sep. 7, 2021

(54) FINGERPRINT SENSOR AND DISPLAY DEVICE

(71) Applicants: CONNECTEC JAPAN Corporation, Niigata (JP); FUJIKIN INCORPORATED, Osaka (JP)

(72) Inventors: Hiroshi Komatsu, Niigata (JP); Akane Suzuki, Osaka (JP); Jun Kimura, Osaka (JP); Kensuke Kojima, Osaka (JP)

(73) Assignees: CONNECTEC JAPAN CORPORATION, Niigata (JP); FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/772,463

(22) PCT Filed: Nov. 26, 2018

(86) PCT No.: PCT/JP2018/043381
§ 371 (c)(1),
(2) Date: Jun. 12, 2020

(87) PCT Pub. No.: WO2019/130934
PCT Pub. Date: Jul. 4, 2019

(65) Prior Publication Data
US 2020/0401780 A1  Dec. 24, 2020

(30) Foreign Application Priority Data
Dec. 28, 2017  (JP) ............................. JP2017-253601

(51) Int. Cl.
*G06K 9/00* (2006.01)

(52) U.S. Cl.
CPC ................................ *G06K 9/0004* (2013.01)

(58) Field of Classification Search
CPC ... G06K 9/0004; A61B 5/1172; G06F 3/0354; G06F 3/041; G06F 3/042; G06F 3/03547; G06T 1/00; G09F 9/30
See application file for complete search history.

(56) References Cited

U.S. PATENT DOCUMENTS

2006/0066766 A1   3/2006  Tanaka et al.
2007/0253607 A1 * 11/2007  Higuchi ............... G06K 9/0012
                                                          382/124

(Continued)

FOREIGN PATENT DOCUMENTS

JP   2002-245443   8/2002
JP   2003-287731   10/2003

(Continued)

OTHER PUBLICATIONS

International Search Report (ISR) in International Application No. PCT/JP2018/043381, dated Dec. 25, 2018.

*Primary Examiner* — Premal R Patel
(74) *Attorney, Agent, or Firm* — Greenblum & Bernstein, P.L.C.

(57) ABSTRACT

A fingerprint sensor for a display device capable of suppressing loss of light due to diffraction of light and a display device with this fingerprint sensor are provided. A fingerprint sensor for a display device having a plurality of photosensors arranged in a matrix, each of the photosensors has a semiconductor film for converting incident light into an electric signal, and a bottom gate electrode as a light shielding film arranged on a lower layer side of the semiconductor film for blocking incident light from the lower layer side to the semiconductor film, wherein the bottom gate electrode has four corner portions in an outer contour shape in a top view, and each of the corner portions is rounded.

8 Claims, 9 Drawing Sheets

(56) References Cited

U.S. PATENT DOCUMENTS

| | | | | |
|---|---|---|---|---|
| 2007/0257254 | A1* | 11/2007 | Yang | H01L 27/3272 |
| | | | | 257/40 |
| 2011/0096047 | A1* | 4/2011 | Endo | G01J 1/04 |
| | | | | 345/207 |
| 2011/0122111 | A1 | 5/2011 | Brown et al. | |
| 2013/0099290 | A1* | 4/2013 | Itoh | H01L 31/1136 |
| | | | | 257/225 |
| 2015/0371074 | A1* | 12/2015 | Lin | H01L 25/167 |
| | | | | 382/124 |
| 2016/0037098 | A1* | 2/2016 | Lee | H01L 27/307 |
| | | | | 257/40 |
| 2016/0370672 | A1* | 12/2016 | Ochiai | G02F 1/136209 |
| 2017/0153474 | A1* | 6/2017 | Kurokawa | G02F 1/1354 |
| 2017/0288001 | A1 | 10/2017 | Ito | |
| 2017/0293378 | A1* | 10/2017 | Ahn | G06F 3/0445 |
| 2017/0363894 | A1* | 12/2017 | Uchida | H01L 29/24 |
| 2019/0157337 | A1* | 5/2019 | Lin | H01L 31/167 |

FOREIGN PATENT DOCUMENTS

| | | |
|---|---|---|
| JP | 2004-326806 | 11/2004 |
| JP | 2006-503333 | 1/2006 |
| JP | 2006-086333 | 3/2006 |
| JP | 2006-126788 | 5/2006 |
| JP | 2009-064071 | 3/2009 |
| JP | 2011-118877 | 6/2011 |
| JP | 2017-188522 | 10/2017 |
| WO | 2008/149706 | 12/2008 |
| WO | 2009/148084 | 12/2009 |

* cited by examiner

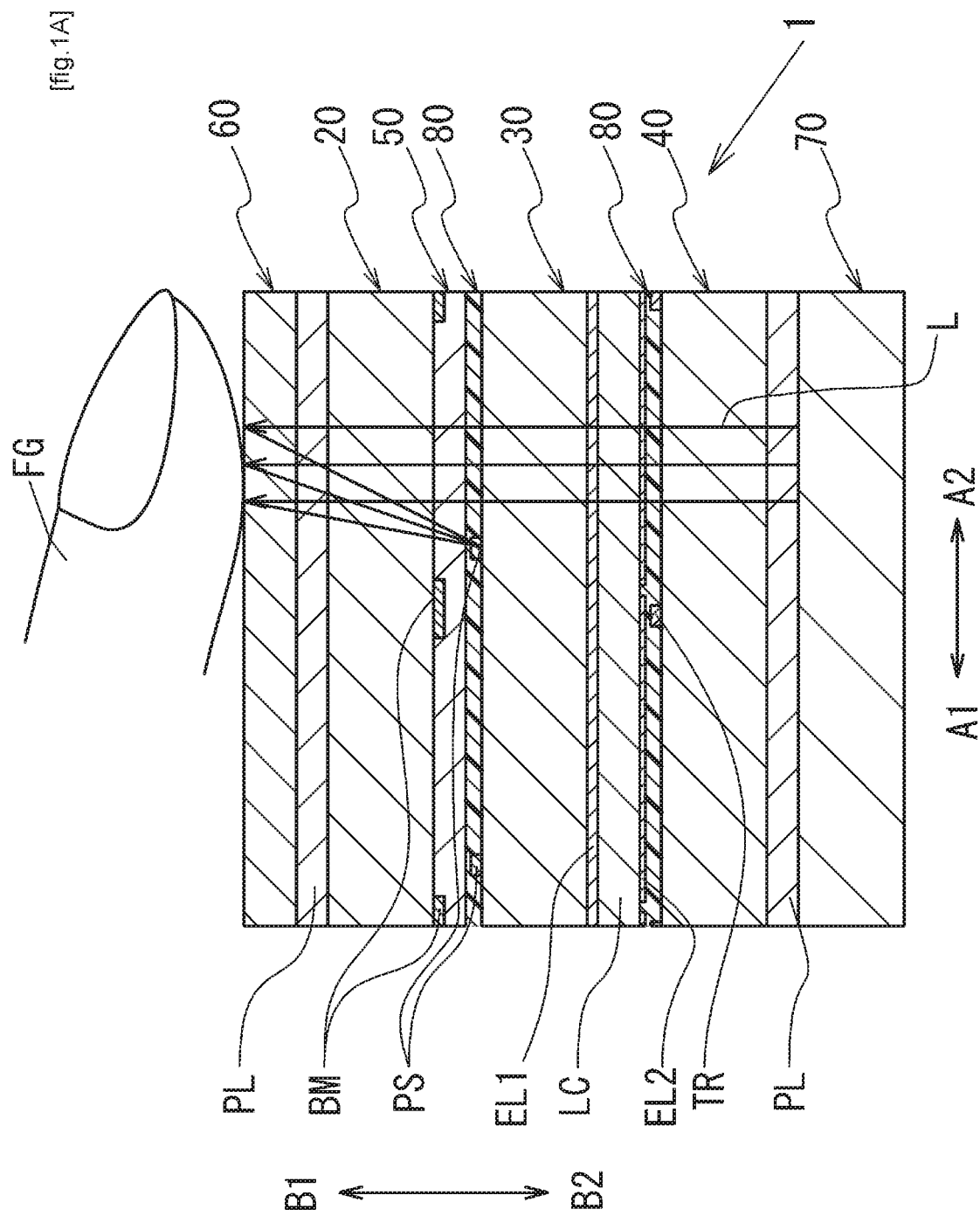

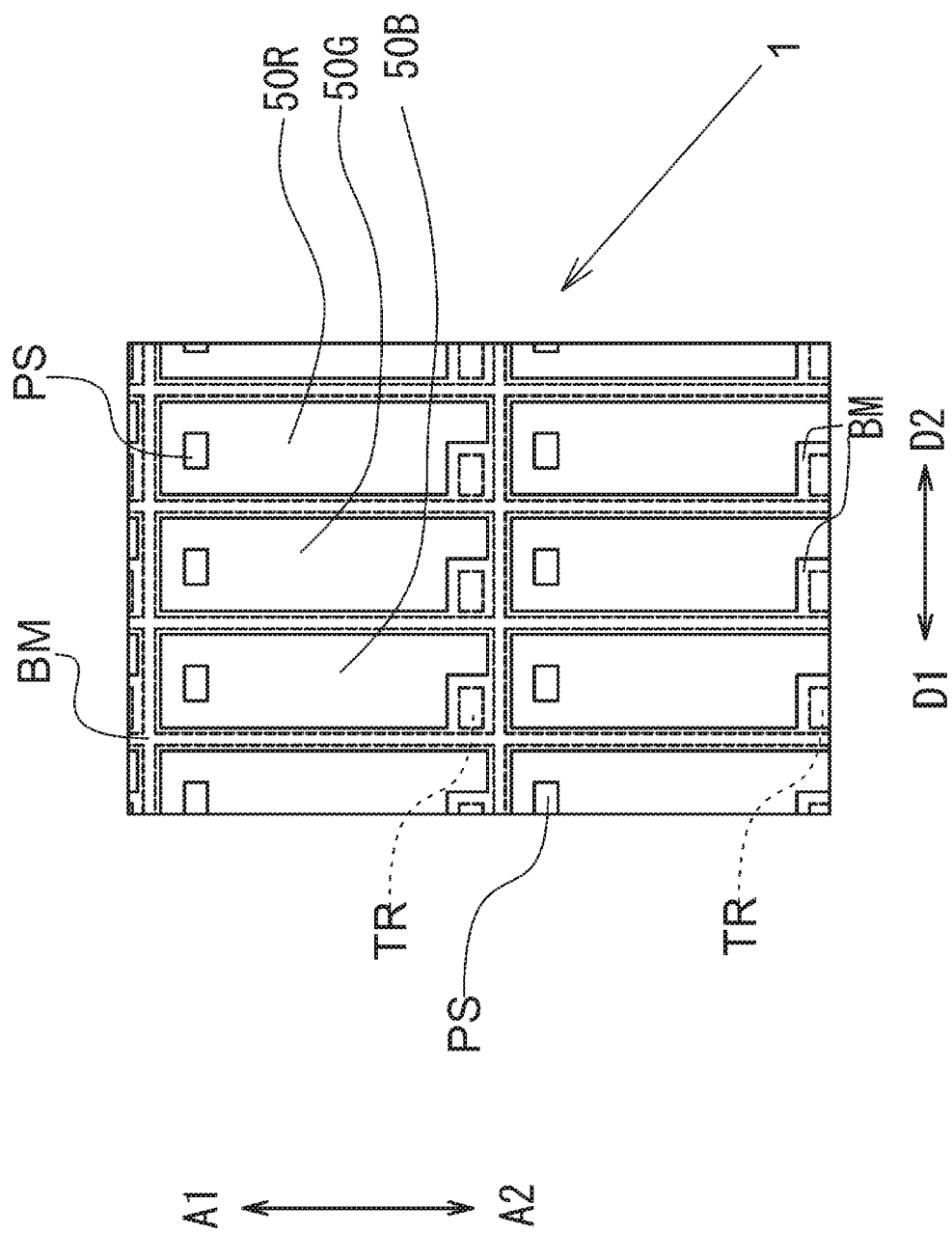
[fig. 1C]

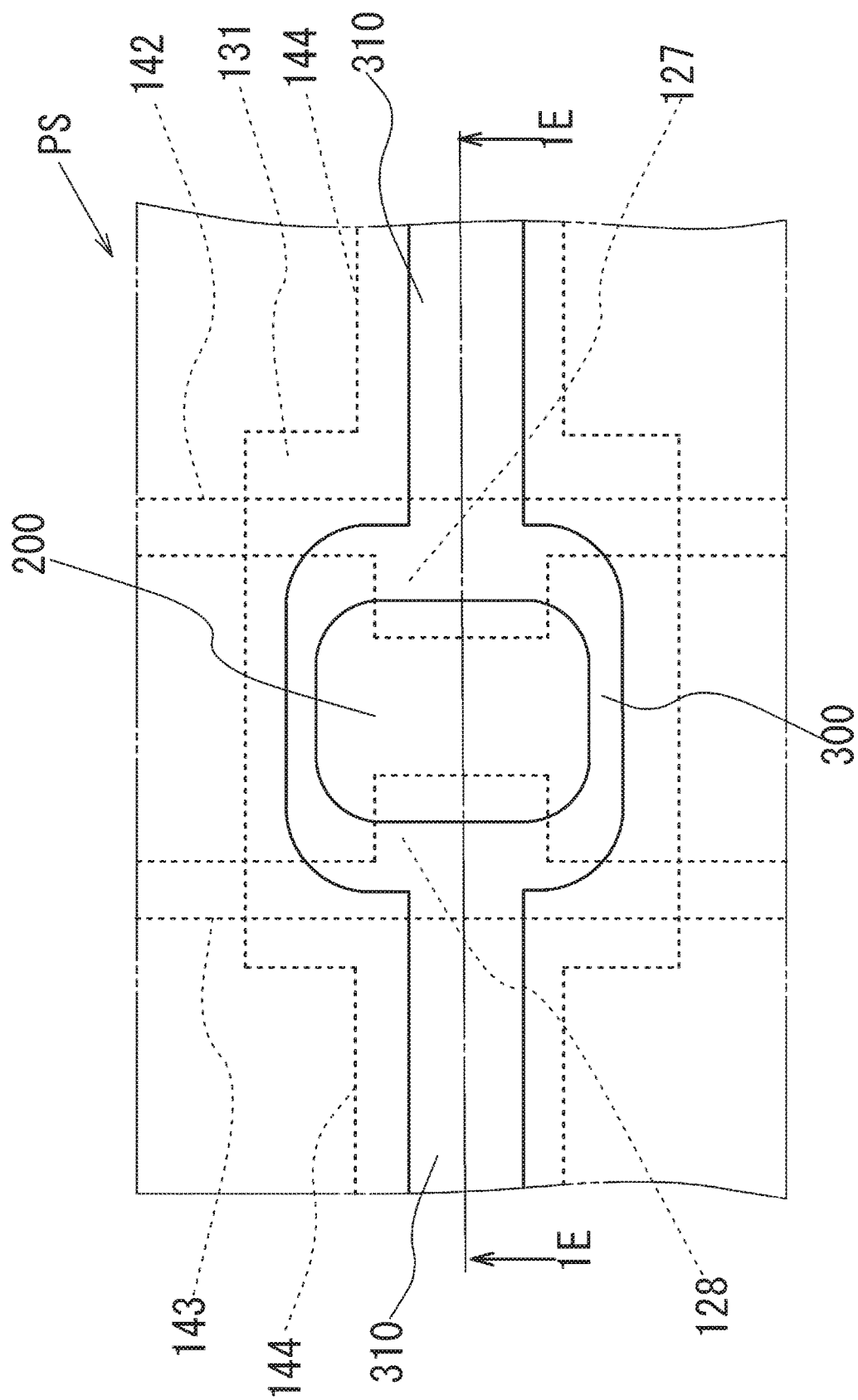
[fig. 1D]

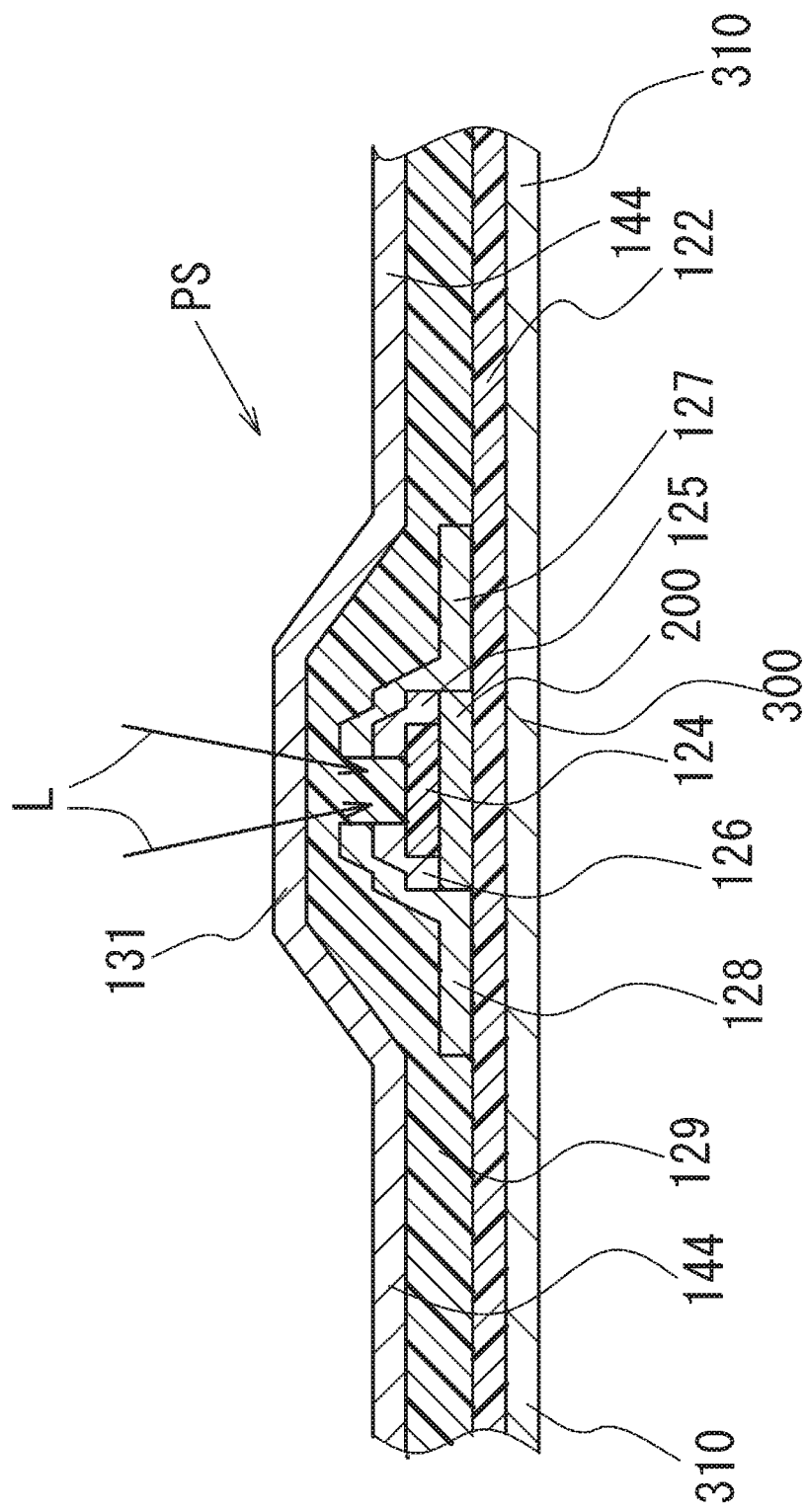
[fig. 1E]

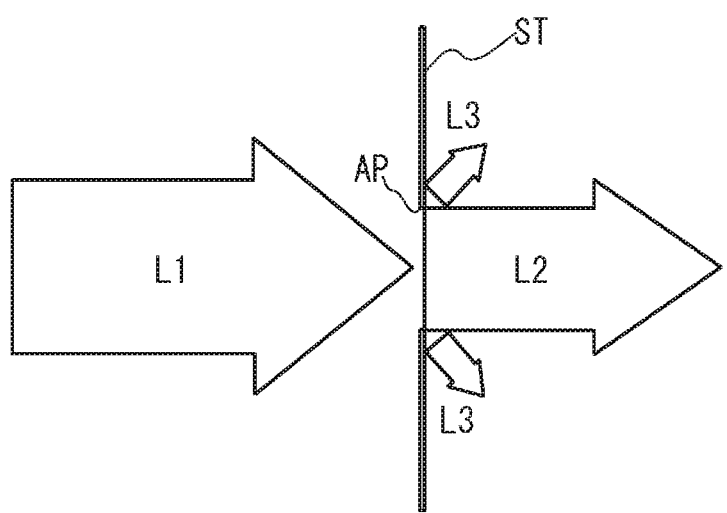
[fig.2]

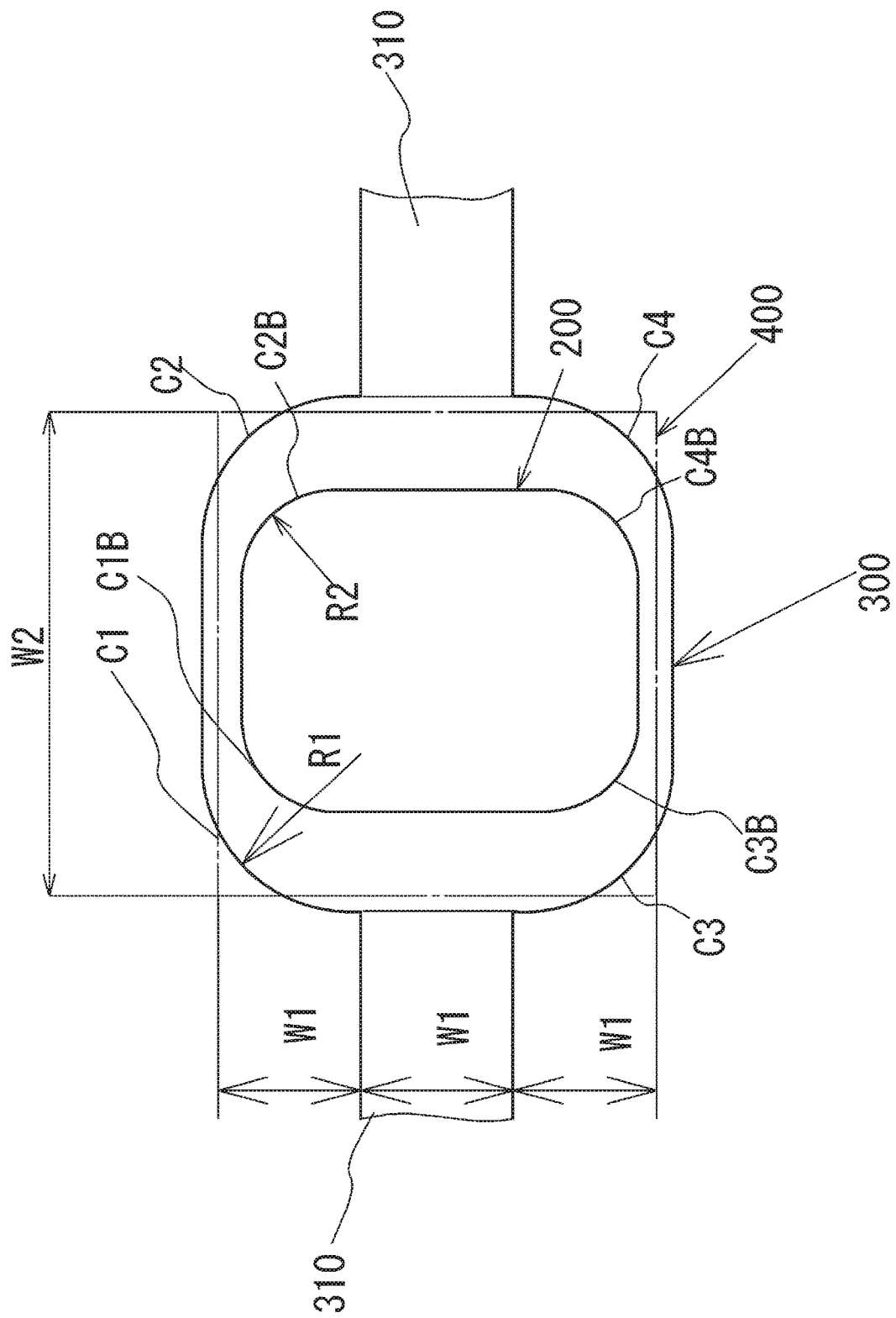
[fig.3]

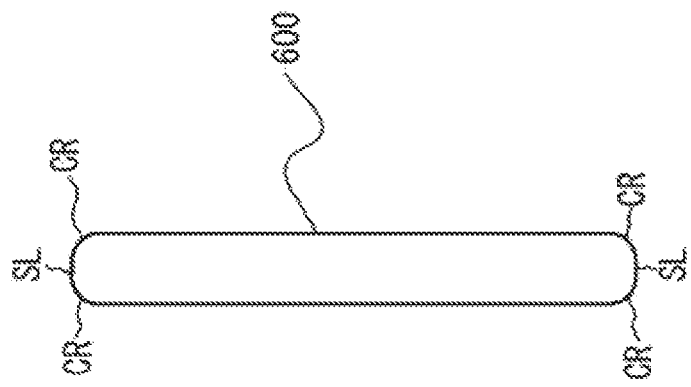
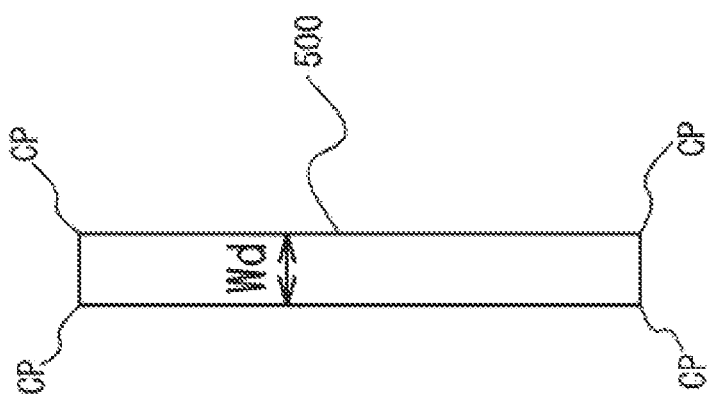
Fig. 4

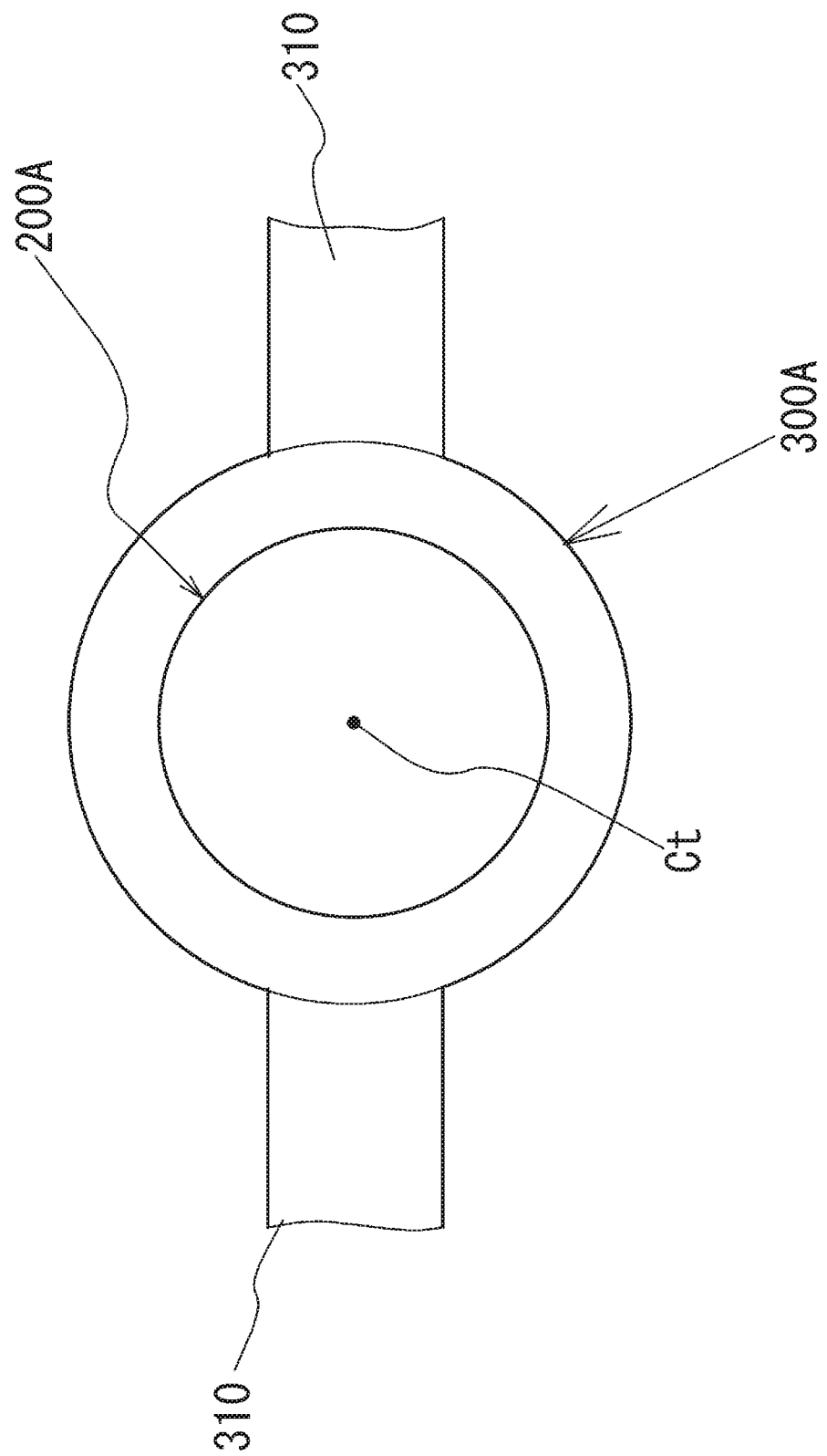

FINGERPRINT SENSOR AND DISPLAY DEVICE

TECHNICAL FIELD

The present invention relates to a fingerprint sensor capable of capturing an image of a fingerprint or the like of a person, and a display device in which the fingerprint sensor is provided in a display screen.

BACKGROUND ART

Patent Literature 1-6 and the like disclose a liquid crystal display and an organic light-emitting diode display integrating a fingerprint sensor using a photosensor.

PATENT LITERATURE

PTL 1: Japanese Laid-Open Patent Application No. 2003-287731
PTL 2: Japanese Laid-Open Patent Application No. 2004-326806
PTL 3: Japanese Laid-Open Patent Application No. 2006-503333
PTL 4: Japanese Laid-Open Patent Application No. 2006-086333
PTL 5: Japanese Laid-Open Patent Application No. 2002-245443
PTL 6: Japanese Laid-Open Patent Application No. 2009-064071

SUMMARY OF INVENTION

Technical Problem

When the fingerprint sensor using the photosensor is provided in the screen of the liquid crystal display panel, it is necessary to provide a light shielding film, which blocks light from entering from the back side to the semiconductor film for fingerprint imaging of each photosensor, on the back side of each semiconductor film.

When providing the light shielding film as described above, diffraction of light occurs at the periphery of the light shielding film, causing loss of light output from the display screen. This loss of light can be a factor that lowers the brightness of the display screen. In addition, if such a fingerprint sensor is provided in a portion of the screen, the presence of the fingerprint sensor may become more noticeable in the display screen.

An object of the present invention is to provide a display device having a fingerprint sensor and the fingerprint sensor for a display device capable of suppressing loss of light due to diffraction of light.

Solution to Problem

The fingerprint sensor according to the first aspect of the present invention is a fingerprint sensor for a display device, having a plurality of photosensors arranged in a matrix,
  each of the photosensors comprising:
   a semiconductor film for converting incident light into an electrical signal; and
   a light shielding film disposed on the lower layer side than the semiconductor film and for blocking incidence of light to the semiconductor film from the lower layer side, wherein
   an outer contour shape in a top view of the light shielding film is rounded to suppress the diffraction of light from the lower layer side.

A fingerprint sensor according to a second aspect of the present invention is a fingerprint sensor for a display device, having a plurality of photosensors arranged in a matrix,
  each of the photosensors comprising:
   a semiconductor film for converting incident light into an electrical signal, and
   a light shielding film disposed on the lower layer side than the semiconductor film and for blocking incidence of light to the semiconductor film from the lower layer side, wherein
   the light shielding film has four corner portions in outer contour shape in a top view,
   each of the four corner portions has a radius of curvature exceeding a radius of curvature of roundness that may occur in corner portions of the light shielding film due to a forming process including a photolithography process.

Preferably, the radius of curvature of each of the corners is 2 μm or more.

More preferably, the configuration can be made in which the outer contour shape in a top view of the semiconductor film is rounded to correspond to the light shielding film.

A fingerprint sensor according to a third aspect of the present invention is a fingerprint sensor for a display device, having a plurality of photosensors arranged in a matrix,
  each of the photosensors comprising:
   a semiconductor film for converting incident light into an electrical signal; and
   a light shielding film disposed on a lower layer side than the semiconductor film and for blocking incidence of light from the lower layer side to the semiconductor film, wherein
   an outer contour shape of the light shielding film in a top view is substantially entirely formed by curves.

Preferably, a configuration can be employed in which outer contour shape in a top view of the semiconductor film is substantially entirely formed by curves to correspond to the outer contour shape of the light shielding film.

More preferably, the light shielding film may have a configuration in which the outer contour shape in a plan view is substantially circular, and the outer contour shape in a top view of the semiconductor film is substantially concentric with the light shielding film.

The display device according to the present invention comprises the fingerprint sensor provided in a display screen.

Advantageous Effects of Invention

According to the present invention, by rounding the outer contour shape of the light shielding film, the circumferential length of the light shielding film is shortened, and the amount of diffraction of light can be reduced in accordance with the reduction in the amount of shortening. As a result, it is possible to reduce loss of the light output to the display screen due to diffraction of the light caused by the fingerprint sensor provided in the screen of the display device.

BRIEF DESCRIPTION OF DRAWINGS

FIG. 1A is a sectional view showing an example of a structure of a display device to which the present invention is applied.
FIG. 1C is a plan view viewed from the display surface side of the display device of FIG. 1A.

FIG. 1D is a plan view showing a structure example of a photosensor.

FIG. 1E is a sectional view in 1E-1E line of FIG. 1D.

FIG. 2 is a diagram illustrating the diffraction of light (the principle of Huygens).

FIG. 3 is a diagram showing the relationship between the bottom gate electrode and the semiconductor film in a top view of the photosensor, according to an embodiment of the present invention.

FIG. 4 is a diagram illustrating the lower limit value of the roundness of the bottom gate electrode.

FIG. 5 is a diagram showing the outer contour shape of the bottom gate electrode and the semiconductor film in a top view of the photosensor according to a second embodiment of the present invention.

DESCRIPTION OF EMBODIMENTS

Figure 1B:
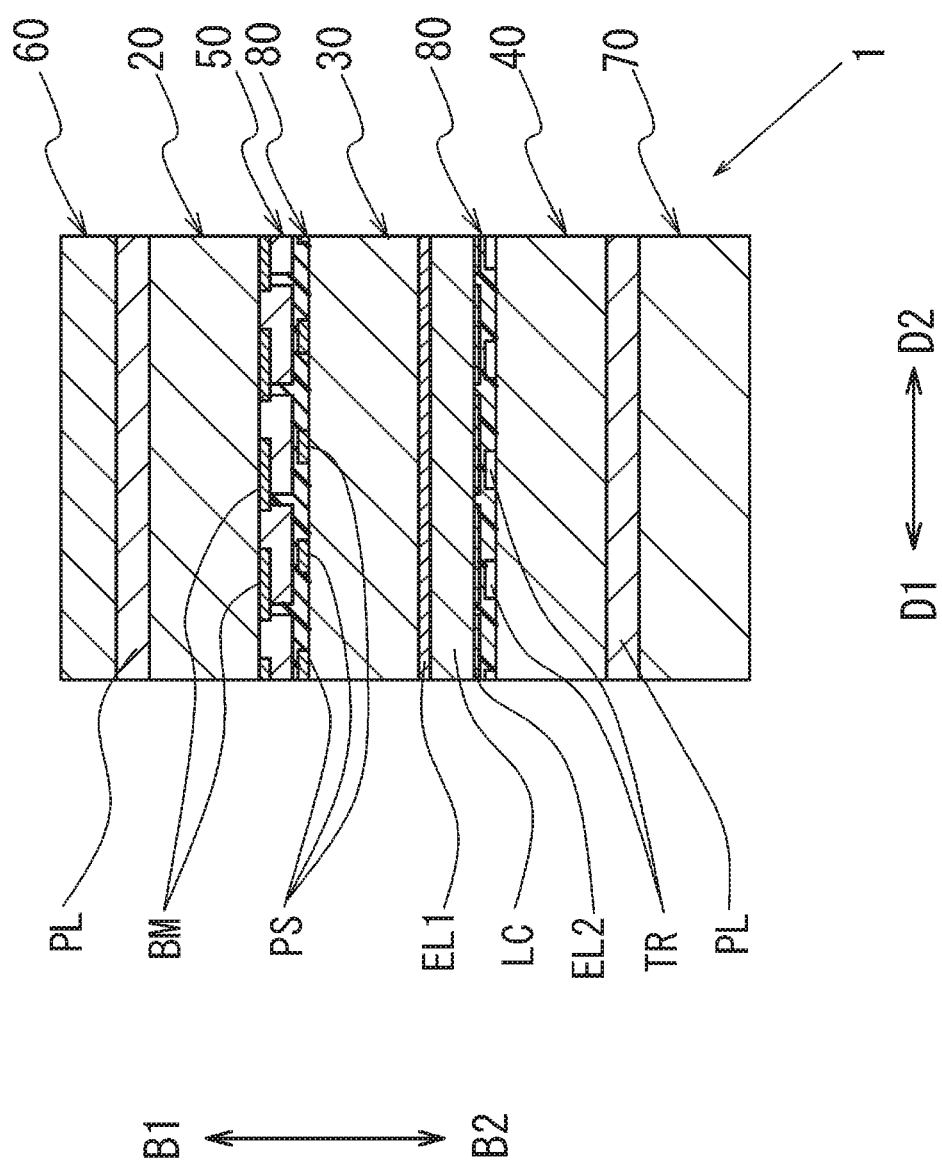
FIG. 1B is a sectional view in a direction perpendicular to FIG. 1A.

Embodiments of the present invention will be described below with reference to the drawings.

First Embodiment

FIGS. 1A to 1C show examples of structures of display devices to which the present invention is applied. FIG. 1A to FIG. 1C show cut out portions of a display device 1, and FIG. 1A is a cross-sectional view of the thickness directions B1 and B2 along the predetermined directions A1 and A2, and FIG. 1B is a cross-sectional view of the thickness directions B1 and B2 along the directions D1 and D2 perpendicular to the directions A1 and A2, and FIG. 1C is a plan view. Among the directions B1 and B2, B1 indicates the display surface side, and B2 indicates the non-display surface side opposite to the display surface side. In the plane view of FIG. 1C, transparent or translucent objects are omitted, and only the black matrix BM, the photosensor PS, and the switching element TR are shown. Of these, portions hidden behind the black matrix BM are indicated by dotted lines.

Display device 1 is a thin film transistor (TFT) type active matrix liquid crystal display. Since the configuration of the active matrix liquid crystal display is well known, the detailed description of the well-known configuration is omitted in the following description.

As shown in the figure, the glass substrates 20, 30, 40 as transparent substrates are provided in this order from the display surface side B1 toward the non-display surface side B2. In place of the glass substrates, plastic substrates such as polycarbonate substrates can be used.

The display surface side B1 of the glass substrate 20 is provided with a polarizing element PL, a transparent cover glass 60 is provided on the polarizing element PL. A fingerprint image can be captured by bringing a finger FG of the human body into contact with the surface of the cover glass 60.

The non-display surface side B2 of the glass substrate 20 is provided with a color filter 50.

Color filter 50 has a black matrix BM having a light shielding property formed in a lattice shape corresponding to each pixel of the screen on the non-display surface side B2 of the glass substrate 20, and the coloring units 50R, 50G, and 50B for transmitting light. As the material of the black matrix BM, various materials can be used, but a metal chromium film can be used for the reasons of light shielding, ease of manufacturing, corrosion resistance, and the like. The coloring units 50R, 50G, and 50B are formed of a well-known resist material, and are, for example, an organic resin material containing a pigment.

On the display surface side B1 of the glass substrate 40, switching elements TR each made of thin film transistor (TFT) are formed in a matrix shape corresponding to pixels, on the switching elements TR, with a protective insulating film 80 interposed, pixel electrodes EL2 are formed in a matrix shape. As the TFTs, well-known low-temperature poly-Si (LTPS) type or amorphous Si type is employed.

The non-display surface side B2 of the glass substrate 30, a common electrode EL1 facing the pixel electrodes EL2 is formed. The common electrode EL1 and the pixel electrodes EL2 are formed of a transparent conductive film such as indium tin oxide (ITO).

Well-known liquid crystal materials LC are filled between the common electrode EL1 and the pixel electrodes EL2.

The non-display surface B2 side of the glass substrate 40 is provided with a polarizing element PL, the backlight 70 as a light source is provided on the non-display surface side B2 of the polarizing element PL. As the backlight 70, a well-known backlight is employed.

On the display surface side B1 of the glass substrate 30, an array of transparent photosensors PS arranged in a matrix is formed on a portion of the screen of the display device. The photosensors PS can also be provided throughout the screen. In the present embodiment, a single photosensor PS is provided for each pixel, but the construction is not limited thereto, and it is also possible to provide a plurality of photosensors PS for each pixel. The array of the photosensors PS is configure to receive light passing through the coloring units 50R, 50G, and 50B of the color filter 50 from the display surface side B1 toward the non-display surface B2 side, and detect the light intensity of each of R (red), G (green) and B (blue) colors.

As shown in FIG. 1A, light L from the backlight 70 is reflected by a finger FG placed on the cover glass 60, and the reflected light passes through the coloring units 50R, 50G, 50B of the color filter 50 and is incident on the photosensor PS. In FIG. 1A, the finger FG is schematically shown as small, but in reality, a plurality of sets of RGB photosensors PS are arranged within the intervals of one stripe of the fingerprint, and the intensities of the respective RGB lights of the reflected lights from the corresponding fingerprint portions are detected. By mapping this, a color image of the fingerprint can be captured.

FIG. 1D and FIG. 1E show structural examples of a single photosensor PS according to an embodiment of the present invention.

Photosensor PS shown in FIG. 1D and FIG. 1E is a TFT (thin film transistor) of a well-known double-gate structure, 200 is a semiconductor film, 300 is a bottom gate electrode, 310 is a bottom gate electrode. 122 is a bottom gate insulating film, 124 is a channel protective film, 125 is an extrinsic semiconductor film, 126 is an extrinsic semiconductor film, 127 is a source electrode, 128 is a drain electrode, 129 is an interlayer insulating film, 131 is atop gate electrode, 142 is a source line, 143 is a drain line, and 144 is a top gate line.

In FIG. 1D, the semiconductor film 200, the bottom gate electrode 300 and the bottom gate line 310 are drawn by solid lines, and other components are drawn by dotted lines.

The photosensor PS is a photoelectric conversion element, and includes a bottom gate electrode 300, a semiconductor film 200 facing the bottom gate electrode 300 and sandwiching a bottom gate insulating film 122 between the bottom gate electrode 300, a channel protective film 124 formed on a central portion of the semiconductor film 200, extrinsic semiconductor films 125 and 126 formed on both end portions of the semiconductor film 200 so as to be separated from each other, a source electrode 127 formed on the extrinsic semiconductor film 125, a drain electrode 128 formed on the extrinsic semiconductor film 126, a semiconductor film 200, and a top gate electrode 131 facing the semiconductor film 200 while sandwiching an interlayer insulating film 129 and a channel protective film 124.

Bottom gate electrodes 300 are formed in a matrix form on the display surface side B1 of the glass substrate 30 described above so as to correspond to the photosensors PS. On the display surface side B1 of the glass substrate 30, a bottom gate line 310 extending laterally is formed, and the bottom gate electrodes 300 of photosensors PS which are laterally arranged in the same row are formed integrally with the common bottom gate line 310. Bottom gate electrode 300 has conductivity and light shielding property, and is formed of a material having conductivity and light shielding property such as Cr. Mo. Ta, W. Bottom gate line 310 is formed of a material having at least conductivity, may have a light-transmitting property at the same time. Examples of the conductive and light-transmitting material include indium oxide, zinc oxide, or tin oxide, or a mixture containing at least one of them (e.g., tin-doped indium oxide (ITO), zinc-doped indium oxide).

On the bottom gate electrode 300 and the bottom gate line 310, the bottom gate insulating film 122 common to all photosensors PS is formed. The bottom gate insulating film 122 has an insulating property and a light transmitting property, and is made of, for example, silicon nitride or silicon oxide.

On the bottom gate insulating film 122, a semiconductor film 200 is formed for each photosensor PS. The semiconductor film 200 is a layer formed of amorphous silicon or polysilicon. A channel protective film 124 is formed on the semiconductor film 200. Channel protective film 124 has a function of protecting the interface of the semiconductor film 200 from the etchant used in patterning, has an insulating and light-transmitting property, and made of, for example, silicon nitride or silicon oxide. When light L is incident on the semiconductor film 200, the semiconductor film is activated to cause electron-hole pairs in an amount corresponding to the amount of light be generated around the interface between the channel protective film 124 and the semiconductor film 200.

An extrinsic semiconductor film 125 is formed on one end portion of the semiconductor film 200 so as to partially overlap with the channel protective film 124, and an extrinsic semiconductor film 126 is formed on the other end portion of the semiconductor film 200 so as to partially overlap with the channel protective film 124. The extrinsic semiconductor films 125 and 126 are made of polysilicon containing n-type impurity ions.

A patterned source electrode 127 is formed on the extrinsic semiconductor film 125. A patterned drain electrode 128 is formed on the extrinsic semiconductor film 126. Further, the source line 142 and the drain line 143 extending in the longitudinal direction on the FIG. 1D are formed on the bottom gate insulating film 122, the source electrodes 127 of each photosensor PS of the same column arranged in the longitudinal direction are formed integrally with the common source line 142, and the drain electrodes 128 of each of the photosensors PS of the same column arranged in the longitudinal direction are formed integrally with the common drain line 143. Source electrode 127, drain electrode 128, source line 142 and drain line 143 are at least electrically conductive and any light-shielding or light-transmitting material is applicable. Examples of the light-shielding conductive material include Cr, Mo, Ta, and W. Examples of the light-transmitting conductive material include indium oxide, zinc oxide, or tin oxide, or a mixture containing at least one of these (e.g., tin-doped indium oxide (ITO), zinc-doped indium oxide).

In the example of FIG. 1D, although the light shielding source line 142 and the drain line 143 overlap corners of the bottom gate electrode 300, if they are arranged not to overlap the corners, the effect of the present invention is further exhibited.

Further, when the source line 142 and the drain line 143 are composed of a conductive and light-transmitting material, it is possible to freely lay out each corner portion of the bottom gate electrode 300, the source line 142 and the drain line 143 while maximizing the effect of the present invention.

A common interlayer insulating film 129 is formed on the channel protective film 124, the source electrode 127, the drain electrode 128, the source line 142, and the drain line 143 of the photosensor PS. The interlayer insulating film 129 has an insulating property and a light-transmitting property, and is made of, for example, silicon nitride or silicon oxide.

A patterned top gate electrode 131 is formed on the interlayer insulating film 129. Further, on the interlayer insulating film 129, there is formed a top gate line 144 extending laterally, and the top gate electrode 131 of each photosensor PS of the same row arranged laterally are formed integrally with the common top gate line 144. The top gate electrode 131 and the top gate line 144 are conductive and light-transmitting metal oxides, and are formed of, for example, indium oxide, zinc oxide, or tin oxide, or a mixture containing at least one of them (e.g., tin-doped indium oxide (ITO), zinc-doped indium oxide).

On the top gate electrode 131 and the top gate line 144, not shown, a common protective insulating film is formed. The protective insulating film has an insulating property and a light-transmitting property, and is made of, for example, silicon nitride or silicon oxide.

Photosensor PS configured as described above is a transparent photoelectric conversion element having a semiconductor film 200 as a light receiving portion.

The above-described layers are formed on the glass substrates 20, 30, and 40 by appropriately performing a film-forming process such as a well-known PVD method or a CVD method, a mask process such as a photolithography method, and a thin film patterning process such as an etching method. Thereafter, the glass substrate 20 and the glass substrate 30 are positioned so that the color filter 50 and the photosensor PS are opposed to each other, and the substrates are bonded to each other using an adhesive such as an ultraviolet curing resin. To such a bonded product, a process of attaching the glass substrate 40 and injecting the liquid crystal material LC, and the like is applied to produce the display device 1.

In the photosensor PS described above, the bottom gate electrode 300 of the present invention as a light shielding film prevents the light from the backlight 70 from entering the semiconductor film 200. Diffraction phenomenon of light occurs in the outer peripheral edge portion of the bottom gate electrode 300.

FIG. 2 shows the principle of the diffraction phenomenon of light.

The restriction ST shown in FIG. 2 has an aperture AP, and when irradiating the light L1 toward the aperture AP, the light L1 normally travels straight as in the light L2 in FIG. 2 when passing through the aperture AP, but a portion of the light passing near the inner peripheral edge of the aperture AP is bent to be diffracted light L3, which causes a loss due to the diffracted light. The amount of diffracted light L3 increases as the circumferential length of the peripheral portion of the aperture AP increases.

Therefore, in order to reduce the amount of diffracted light L3 of the aperture AP, it is considered to be effective to shorten the circumferential length of the peripheral portion of the aperture AP.

Table 1 below shows the circumferential length and circumferential length ratio in a case where the shape of the aperture AP is a circular having a radius R and a case where the aperture is square under the same area conditions.

TABLE 1

|  | Area | Circumferential length | Circumferential length ratio |
|---|---|---|---|
| Circle (raidus R) | $\pi R^2$ | $2\pi R$ | $\sqrt{\pi}/2 \approx 0.89$ |
| Snare having a side length of $\sqrt{\pi} \times R$ | $\pi R^2$ | $\sqrt{\pi} \times 4R$ | 1 |

As can be seen from Table 1, it can be said that the amount of light loss due to diffraction of light increases by about 10% when the shape of the aperture AP is square as compared with the case where it is circular even if the area is the same.

In the present embodiment, according to the principle of suppressing the loss of light due to diffraction of light described above, as shown in FIG. 3, the outer contour shape in the top view of the bottom gate electrode 300 is rounded.

In FIG. 3, the bottom gate electrode 300 has four corners C1 to C4, and the radius of curvature of each of the corner portions C1 to C4 is R1.

Rectangle shown by a one-dot chain line in FIG. 3 is a virtual electrode 400 having the same area as the bottom gate electrode 300.

W1 in FIG. 3 is the width of the bottom gate line 310, 3×W1 is the width in the longitudinal direction of the virtual electrode 400. W2 is the width in the lateral direction of the virtual electrode. In the present embodiment, W1 is 10 μm, and W2 is 30 μm.

The radius of curvature R1 is 12 μm.

The radius of curvature R1 can be variously set, but the lower limit value is preferably larger than 2 μm.

As shown in FIG. 4, to a film formed in a film forming process such as a well-known PVD method and CVD method, an elongated mask pattern 500 having four corner portions CP at right angles is transferred by a mask process such as a photolithography method and a thin film patterning process such as an etching method, while the width Wd of the mask pattern 500 is variously changed, to form film patterns 600 of the same material as the bottom gate electrode 300.

Even if the corner portions CP of the mask pattern 500 are at right angles, roundness CR is formed in the four corner portions of the film pattern 600 formed.

If the width Wd of the mask pattern 500 is up to about 6 μm, straight portions SL are formed at both ends in the longitudinal direction of the film pattern 600.

It was found that when the width Wd of the mask pattern 500 was narrowed down to 4 μm, the straight portion SL disappeared.

In this way, roundness is formed in each corner portion C1 to C4 of the bottom gate electrode 300 due to the forming step of the bottom gate electrode 300, but by increasing the radius of curvature R1 than the radius of curvature of the roundness formed, the effect of the present invention is exhibited. For this reason, the lower limit value of the radius of curvature R1 is made larger than 2 μm.

In FIG. 3, the four corner portions C1B to C4B of the semiconductor film 200 are rounded corresponding to the bottom gate electrode 300. The reason why the corner portions C1B to C4B of the semiconductor film 200 are rounded is to secure the distance between the outer peripheral edge portion of the bottom gate electrode 300 and the outer peripheral edge portion of the semiconductor film 200 to a certain value or more. If the distance between the corner portions C1 to C4 of the bottom gate electrode 300 and the corner portions C1B to C4B is too close, the light shielding function of the bottom gate electrode 300 may be partially lost, so the rounding is formed in order to avoid this. Further, even if the corner portions C1B to C4B of the semiconductor film 200 are rounded, the light-receiving sensitivity of the semiconductor film 200 is not lowered if the area of the semiconductor film 200 is maintained. The radius of curvature R2 of the corner portions C1B to C4B is not particularly limited, but is set within a range in which the distance between the outer peripheral edge portion of the bottom gate electrode 300 and the outer peripheral edge portion of the semiconductor film 200 can be secured to a certain value or more.

In the present embodiment, the four corner portions C1B to C4B of the semiconductor film 200 are rounded, but when the distance between the outer peripheral edge portion of the bottom gate electrode 300 and the outer peripheral edge portion of the semiconductor film 200 can be secured at a certain level or more, a configuration in which the semiconductor film 200 is not rounded may be employed.

As described above, according to the present embodiment, by applying a rounding process to the corner portions C1 to C4 of the bottom gate electrode 300 as a light shielding film, it is possible to shorten the circumferential length of the bottom gate electrode 300, and as a result, it is possible to suppress the loss of light from the backlight 70.

Second Embodiment

FIG. 5 shows the outer contour shape of the bottom gate electrode and the semiconductor film in a top view of the photosensor according to a second embodiment of the present invention. In the second embodiment, the configuration other than the shape of the semiconductor film 200A and the bottom gate electrode 300A is the same as the first embodiment.

Outer contour shape in top view of the bottom gate electrode 300A is circular except for the connecting portion to the bottom gate line 310 is substantially circular. Further, the outer contour shape in the top view of the bottom gate electrode 300A is formed in substantially all curves except the connecting portion to the bottom gate line 310.

Thus, by making the outer contour shape of the bottom gate electrode 300A substantially a circular shape in top view, as described with reference to FIG. 2 and Table 1, it is possible to minimize the loss due to diffracted light. In addition, the outer contour shape of the semiconductor film 200A is a concentric circle having the same center as the center Ct of the bottom gate electrode 300A. By setting the outer contour shape of the semiconductor film 200A to be concentric with the bottom gate electrode 300A, it is possible to maintain the light receiving sensitivity of the semiconductor film 200A.

The outer contour shapes of the bottom gate electrode 300A and the semiconductor film 200A are not limited thereto, an they may be elliptical or other curved shapes.

Although a liquid crystal display panel is exemplified as the display device in the above embodiment, the present invention is not limited to this, and the present invention can be applied to other types of liquid crystal display panels, and can be applied to other display devices such as an organic light-emitting diode panel in addition to the liquid crystal display panel.

In the above embodiment, the case where the photosensor of the present invention is provided in the inner layer of the liquid crystal display panel is exemplified, but the present invention is not limited to this, and the photosensor can be provided on the surface of the display device.

In the above embodiment, the case where the bottom gate electrodes 300 and 300A are used as the light shielding films of the present invention is exemplified, but the present invention is not limited to this, and an appropriate light shielding film can be selected as necessary.

REFERENCE SIGNS LIST

1: Display device
20: Glass substrates
30: Glass substrates
40: Glass substrates
50: Color Filter
50R, 50G, 50B: Coloring unit
BM: black matrix
60: Cover glass
70: Backlight
80: Protective insulating film
EL1: Common electrode
EL2: Pixel electrode
PL: Polarizing element
PS: Photosensor
TR: Switching element
LC: Liquid crystal material
122: Bottom gate insulating film
124: Channel protective film
125: Extrinsic semiconductor film
126: Extrinsic semiconductor film
127: Source electrode
128: Drain electrode
129: Interlayer insulating film
131: Top gate electrode
142: Source line
143: Drain line
144: Top gate line
200, 200A: Semiconductor film
300, 300A: Bottom gate electrode (light shielding film)

The invention claimed is:

1. A fingerprint sensor in a display device, the fingerprint sensor comprising:
   a plurality of photosensors arranged in a matrix,
      wherein each of the photosensors comprises:
      a semiconductor film configured to convert incident light into an electrical signal; and
      a light shielding film
         that is disposed on a lower layer side than the semiconductor film, and
         configured to block incidence of light to the semiconductor film from the lower layer side, and
      wherein an outer contour shape in a top view of the light shielding film is rounded to shorten a circumferential length, which suppresses diffraction of light from the lower layer side.

2. The fingerprint sensor according to claim 1, wherein the outer contour shape in a top view of the semiconductor film is rounded to correspond to the light shielding film.

3. A fingerprint sensor in a display device, the fingerprint sensor comprising:
   a plurality of photosensors arranged in a matrix,
      wherein each of the photosensors comprises:
      a semiconductor film configured to convert incident light into an electrical signal, and
      a light shielding film
         that is disposed on a lower layer side than the semiconductor film, and
         configured to block incidence of light to the semiconductor film from the lower layer side,
      wherein the light shielding film has four corner portions in outer contour shape in a top view, and
      wherein each of the four corner portions has a radius of curvature that exceeds a radius of curvature that occurs at corner portions of the light shielding film due to a forming process, the forming process including a photolithography process to shorten a circumferential length, which suppresses diffraction of light from the lower layer side.

4. The fingerprint sensor according to claim 3, wherein the radius of curvature of each of the four corner portions is 2 µm or more.

5. A fingerprint sensor in a display device, the fingerprint sensor comprising:
   a plurality of photosensors arranged in a matrix,
      wherein each of the photosensors comprises:
      a semiconductor film configured to convert incident light into an electrical signal; and
      a light shielding film
         that is disposed on a lower layer side than the semiconductor film, and
         configured to block incidence of light from the lower layer side to the semiconductor film, and
      wherein an outer contour shape of the light-shielding film in a top view is entirely formed by curves to shorten a circumferential length, which suppresses diffraction of light from the lower layer side.

6. The fingerprint sensor of claim 5, wherein the outer contour shape in a top view of the semiconductor film is entirely formed by curves to correspond to the outer contour shape of the light shielding film.

7. The fingerprint sensor according to claim 5, wherein the light shielding film has a circular outer contour shape in the top view.

8. The fingerprint sensor according to claim 7, wherein the outer contour shape of the semiconductor film in a top view is concentric with the light shielding film.

* * * * *